Dec. 27, 1960 R. H. WISE 2,966,072
MOTION CONVERTING MECHANISM WITHIN MOTOR SHAFT
Original Filed Jan. 16, 1957
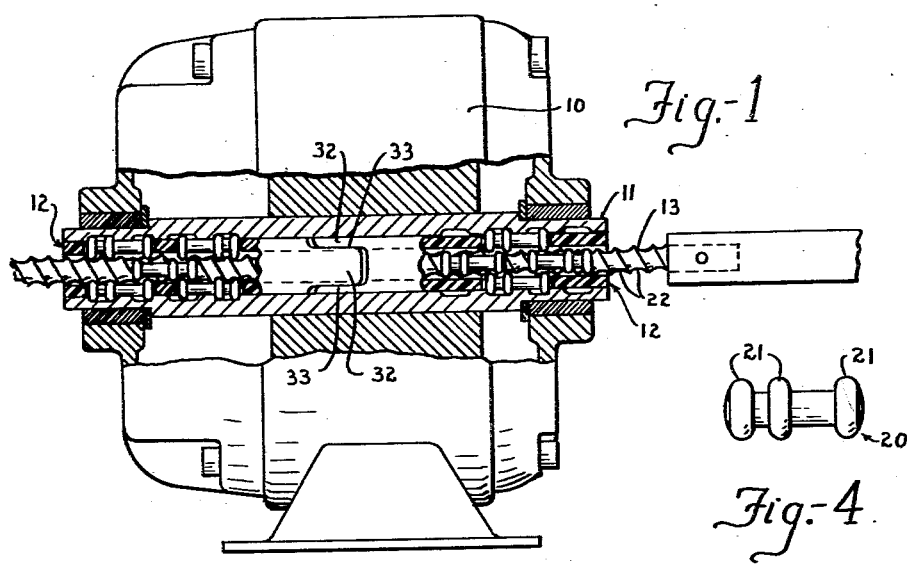
Fig.-1
Fig.-4
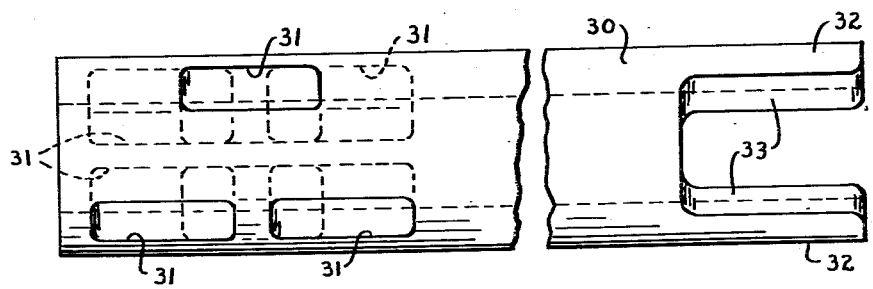
Fig.-5
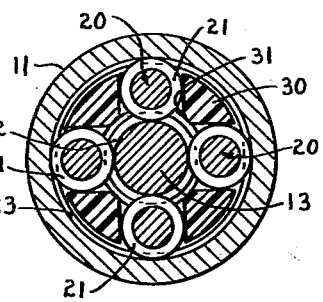
Fig.-3
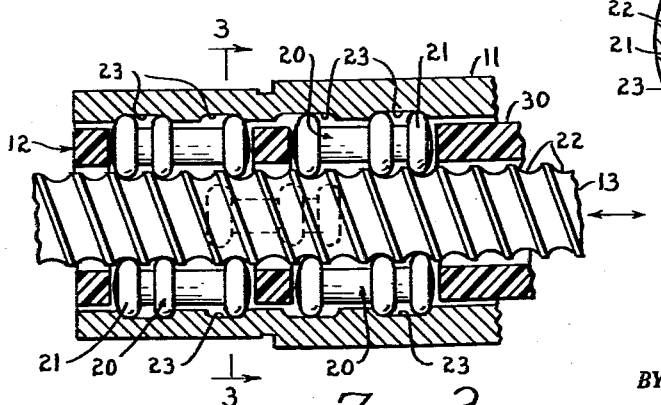
Fig.-2
INVENTOR.
RALPH H. WISE
BY Pedrow and Rubtenwald
ATTORNEYS

United States Patent Office 2,966,072
Patented Dec. 27, 1960

2,966,072

MOTION CONVERTING MECHANISM WITHIN MOTOR SHAFT

Ralph H. Wise, Tampa, Fla., assignor, by mesne assignments, to The Anderson Company, a corporation of Indiana Continuation of application Ser. No. 634,556, Jan. 16, 1957. This application June 22, 1959, Ser. No. 830,973

14 Claims. (Cl. 74—424.8)

This invention relates to motion-converting means and more particularly to a worm and rotating nut for converting rotary motion to reciprocating.

This application is a continuation of my copending application Serial No. 634,556 filed January 16, 1957 and now abandoned.

In the past, it has been proposed to provide cooperating means between the drive shaft of a motor and a threaded element to convert the rotary motion of the drive shaft to reciprocating motion in the threaded shaft, and usually a single nut is made to cooperate with the threaded shaft. In such known applications, undue temperature changes are normally not encountered and such means have been satisfactory for this purpose.

The present invention provides an improvement in this type of mechanism by providing a nut-and-worm construction which may be arranged concentrically within a hollow drive shaft of a motor, the construction being adapted to transmit relatively heavy loads. The construction forming the subject of this invention is adapted to absorb power from the engine in the form of rotary motion and transmit it to a threaded shaft under conditions wherein the nut means remain completely operative at all times despite the fact that they may be subjected to extreme temperature changes. This construction includes driving means for rotating widely spaced nut elements which can accommodate thermal expansion produced by the temperature changes and it includes interlocking means between the nut elements to insure their rotation in unison to eliminate any lock-nut effect which might otherwise be encountered.

The preferred form of the invention is shown in the drawings wherein:

Figure 1 is an assembly view partly broken away showing a side elevation of a motor with the motion-converting mechanism concentrically arranged within the drive shaft thereof;

Figure 2 is a detail view partly broken away showing one of the nut elements of the present invention;

Figure 3 is a view taken on line 3—3 of Figure 2;

Figure 4 is a detail view of one of the rotating bearing elements forming a part of the nut structure of the present invention; and Figure 5 is an enlarged side elevation of a retainer element for one of the nut means.

Referring to the assembly view shown in Figure 1, an electric motor 10 of any conventional reversible design is shown equipped with the hollow drive shaft 11. The shaft 11 is adapted to enclose a plurality of spaced nut means 12 which cooperate with the threaded shaft 13. As the hollow shaft 11 is rotated in first one direction and then the other, the nut means 12 are driven around the shaft 13 to reciprocate the shaft 13 in one direction or the other. As is conventional in this type of motion-converting means, it will be understood that shaft 13 is mounted for reciprocating motion, but is restrained against any substantial rotation with shaft 11 or the nut means 12.

The preferred form of the nut means used in this invention is best shown in Figures 2, 3 and 4. Each of these nut means includes a plurality of roughly dumbbell-shaped elements 20 which are adapted to be spaced around the periphery of shaft 13 with the enlarged portions 21 in engagement with the valleys 22 of the thread formed on the surface of shaft 13 together with a cage or spacer 30 for elements 20. The inner surface of hollow shaft 11 is provided with a plurality of raceways 23 into which the bearing elements 20 are fitted for rolling and driving contact whereby as shaft 11 is driven to rotate, the bearing elements 20 are made to cooperate with the threaded shaft 13 to effect reciprocation one way or the other as shown by the arrow in Figure 2.

The bearing elements 20 are held spaced around the shaft 13 and within the hollow drive shaft 11 by means of a cage or spacer 30 which is best shown in Figure 5. The spacer is tubular to fit over the threaded shaft 13 and its outer diameter is smaller than that of the inside diameter of the hollow shaft 11. The spacer is also provided with a plurality of elongate longitudinally extending apertures 31, each of which is adapted to loosely enclose one of the bearing elements 20 to hold the bearing elements properly positioned within the drive shaft 11 and in position to cooperate with the threaded shaft 13. As disclosed at the right-hand end of Figure 5, the spacer member 30 of each nut means is provided with a forked end construction including prongs 32 having side walls 33 which, as shown in Figure 1, are adapted to be slidingly interfitted with the forked end of the spacer of the adjoining nut means positioned within the drive shaft 11. When the several spacer means are thus assembled within the hollow shaft 11 to hold bearings 20 spaced around the shaft 13, the side walls 33 of each of the spacers 30 are in intimate but longitudinally slidable contact with relation to each other.

One of the purposes of this invention is to reduce the amount of clearance which must be provided between the axial ends of the bearing elements 20 and the ends of the apertures 31 in the spacer elements 30. Provision of such clearance in a machine of this type is made necessary because the inherent characteristics of the more desirable materials currently available for use in making the spacer elements 30, e.g. nylon, which "grows" or elongates under continued use due to the effects of temperature and moisture, as is well known. In following the prior art, the spacer elements were made as one continuous elongate member. The "growing" of the material in the elongate spacer member caused the more remote, axially spaced caged bearing elements 20 to be spread apart whereby the bearing elements 20 attempted to ride up the side of the engaged threads on the threaded shaft and become wedged between the outer axial edges of the more remotely spaced raceways 23. One prior solution to this problem was to provide extra clearance between the axial ends of the bearing elements 20 and the apertures 31 in the elongate spacer member. This added clearance introduced backlash between the drive shaft and threaded shaft, particularly when the direction of rotation of the motor was changed. The added clearance also tended to permit the bearing elements 20 to become canted relative to the axis of the threaded shaft with the resultant noise and malfunctioning of the system.

The instant invention contemplates dividing the elongate spacer member into the two spacer elements 30 which may be formed of any suitable material, but it has been found that certain plastic materials, such as nylon, are well suited for this purpose. Nylon has good wear-resisting characteristics, and is chemically stable, relatively light in weight and strong, all of which characteristics are important in connection with this type of mechanism. In the use to which the present invention may be put, the temperatures may range from possibly a low of 0° F. or lower when the device is used out of doors, to a high of 200° F. when the motor is run intermittently with frequent starting and stopping cycles. Because of the characteristic of nylon to respond to such temperature changes, it is necessary that the axially sliding forked ends 32 be provided to allow for some expansion of the spacer elements while at the same time positively interlocking the two spacer elements for simultaneous rotation.

With the overlapped interengaging forked ends 32 of the adjoining spacer elements 30 positioned within the drive shaft 11 and around the threaded shaft 13, it is possible to convert the rotary motion of the drive shaft to reciprocating motion of the threaded shaft. As shown in Figure 1, when the spacers 30 are assembled within the hollow shaft 11 and over the threaded shaft 13, an axial space is provided between the tip end of one pair of forked ends 32 on one spacer element 30 and the bottom of the pair of valleys formed between the forked ends 32 on the other spacer element 30 whereby the spacer elements 30 can grow axially in both directions without affecting the relative positions of their respective sets of bearing elements 20. In this way the amount of axial clearance needed, between the ends of the individual bearing elements 20 and their associated apertures 31, is substantially reduced without inducing undesirable backlash or encountering the possibility of binding between the bearing elements 20 and the edges of the raceways 23. It is necessary for the forked ends 32 of the adjoining spacer elements 30 to be interlocked in view of the fact that in operation of this mechanism, should one of the nut means 12 become jammed or bind to some degree with respect to the threaded shaft (if it were not for the interlocking forked ends 32) the second nut means might be driven against the jammed one such that a lock-nut effect would result between the nuts spaced along the threaded shaft 13. Such an occurrence would, of course, render the mechanism inoperative. This improved construction has been provided to eliminate the possibility of this happening, and in following this teaching, one nut means is simultaneously and positively rotated with the other such means because of the functioning of the expansion and coupling-joint structure here shown.

It is apparent that in designing each of the spacer elements 30, and particularly the size and position of apertures 31, the "growing" characteristics of the nylon material need to be considered only with respect to the material situated at the short end portion thereof associated with the specific nut means. The expansion joint provided at the interlocked forked ends 32 permits each of the spacers to "grow" under increased temperature and moisture conditions or to "shrink" upon a reversal thereof without affecting the relative longitudinal position of either of the nut means 12 along the threaded shaft 13. Thus, the interlocked forked ends 32 provide a means for accommodating the "growth" of the nylon while at the same time providing interlocking means through faces 33 whereby one nut means is caused to rotate simultaneously with the other, without there existing a possibility that the binding of either element will interfere with the proper operation of the motion-converting mechanism.

In the operation of this invention, it is apparent that the motor 10 upon being energized will drive the hollow shaft 11 in either one direction or the other as desired. As the shaft 11 is rotated, the nut means 12 are caused to rotate around the shaft 13 by reason of the rolling engagement of the enlarged portions 21 of bearing elements 20 in raceways 23 formed on the inner surface of the hollow shaft 11. As the nut means 12 rotate around the relatively nonrotating shaft 13, the enlarged portions 21 of the bearing means 20 engage in the thread 22 provided on the surface of shaft 13 to drive the thread to the right or left depending on the direction of rotation of shaft 11. Thus, shaft 13 is caused to move longitudinally one way or the other as the motor 10 rotates in one direction or the other. Shaft 13, of course, may be connected to the particular means with which this drive is designed to cooperate.

While the above description covers the preferred form of this invention, it is apparent that many modifications may occur to those skilled in the art. Various types of motors and motor-shaft connections might be made. Further, any conventional nut means might be adapted to this construction wherein a spacer is used to hold a plurality of the nut means disposed at spaced points along the threaded shaft, the spacers being maintained in interlocked relation while providing suitable means to accommodate the expansion encountered in normal use of the plurality of spacers. The forked ends 32, and faces 33 of course, may likewise be varied, it being essential only that space for expansion or "growth" in the case of nylon be provided while at the same time providing a positive driving surface between the two elements of the respective spaced nut means so that one spacer is positively rotated when the other is driven. Such modifications thus considered to be equivalents of the present invention and others may occur to those skilled in the art which will fall within the scope of the following claims.

I claim:

1. A means to convert rotary motion to reciprocating motion comprising an elongate rotatably mounted hollow cylindrical member, the inner surface of said hollow member having bearing raceways formed therein, a nonrotatable threaded shaft having its axis coaxial with that of the hollow member, thread-engaging bearing means disposed between said shaft and hollow member and running in the raceways provided in the inner surface of said hollow member, said bearing means including at least two groups of peripherally disposed bearing units, said groups being relatively widely spaced lengthwise in said hollow member and along said shaft, a retainer cage for holding all of said units of one of said groups in their peripherally spaced relation, a second retainer cage for holding another group of said bearing units in their peripherally spaced relation, the contiguous ends of said cages having an axially slidable key interconnection so as to rotate together without any relative angular displacement, and means to rotate said hollow cylindrical member to drive said bearing means whereby to drive said threaded shaft relatively axially along through the hollow member.

2. A means to convert rotary motion to reciprocating motion comprising an elongate rotatably mounted hollow cylindrical member, the inner surface of said hollow member having bearing raceways produced therein, a nonrotatable threaded shaft having its axis coaxial with that of the hollow member, thread-engaging bearing means disposed between said shaft and hollow member and running in the raceways provided in the inner surface of said hollow member, said bearing means including at least two groups of peripherally disposed bearing units, said groups being relatively widely spaced lengthwise in said hollow member and along said shaft, a generally tubular retainer cage for holding all of said units of one of said groups in their peripherally spaced relation, a second retainer cage for holding another group of said bearing units in their peripherally spaced relation, each of said cages extending lengthwise in the cylindrical member to contact one another and surrounding said threaded shaft, the ends of said cages being arranged in interlocked and sliding relation, and means to rotate said hollow cylindrical member to drive said bearing means whereby to drive said threaded shaft relatively axially along through the hollow member.

3. A means to convert rotary motion to reciprocating motion comprising an elongate rotatably mounted hollow cylindrical member, the inner surface of said hollow member having bearing raceways produced therein, a nonrotatable threaded shaft having its axis coaxial with that of the hollow member, thread-engaging bearing means disposed between said shaft and hollow member and running in the raceways provided in the inner surface of said hollow member, said bearing means including two groups of peripherally disposed bearing units, said groups being relatively widely spaced lengthwise in said hollow member and along said shaft, a generally tubular retainer cage having a plurality of closely spaced apertures therein for holding all of said units of one of said groups in their peripherally spaced relation, a second retainer cage having a plurality of closely spaced apertures therein for holding the other group of said bearing units in their peripherally spaced relation, each of said cages extending lengthwise in the cylindrical member to contact one another and to surround a portion of said threaded shaft, the ends of said cages being forked, and said forked ends being arranged in interlocked and sliding relation, means to rotate said hollow cylindrical member to drive said bearing means whereby to drive said threaded shaft relatively axially along through the hollow member.

4. A means to convert rotary motion to reciprocating motion under widely varying temperature conditions comprising an elongate rotatably mounted hollow cylindrical member, the inner surface of said hollow member having bearing raceways produced therein, a nonrotatable threaded shaft having its axis coaxial with that of the hollow member, thread-engaging bearing means disposed between said shaft and hollow member and running in the raceways provided in the inner surface of said hollow member, said bearing means including two groups of peripherally disposed bearing units, each of the units of said groups taking the form of a dumbbell-shaped bearing element, said groups being relatively widely spaced lengthwise in said hollow member and along said shaft, a generally tubular nylon retainer cage having a plurality of closely spaced apertures therein for holding all of said units of one of said groups in their peripherally spaced relation, one of said dumbbell-shaped elements being disposed in each of said apertures, a second nylon retainer cage having a plurality of closely spaced apertures therein for holding the other group of said bearing units in their peripherally spaced relation, each of said nylon cages extending lengthwise in the cylindrical member to contact one another and to surround a portion of said threaded shaft, the ends of said cages being fork shaped, and said forked ends being arranged in interlocked and sliding relation, and means to rotate said hollow cylindrical member to drive said bearing means whereby to drive said threaded shaft relatively axially along through the hollow member.

5. In a motion-converting device, the combination of a hollow drive shaft, there being a plurality of sets of concentric circumferentially continuous annular raceways formed in the inner wall of said drive shaft, an elongate threaded shaft passing through said hollow shaft, a plurality of sets of axially spaced bearing elements disposed between and engaging said raceways and the thread on said shaft, a spacer means for each set of said bearing means disposed concentrically about said threaded shaft within the hollow of the drive shaft, and axially slidable interfitting means joining the contiguous end portions of the spacer means for drivingly connecting the spacer means together whereby the material of one spacer means can expand or contract axially relative to the other spacer means.

6. In a motion-converting device, the combination of a reversible motor having a hollow drive shaft extending therethrough, a plurality of sets of concentric circumferentially continuous annular raceways formed in the inner wall of said shaft, an elongate threaded shaft passing through said hollow shaft and having a continuous helical groove formed in the peripheral surface thereof, a plurality of sets of axially and radially spaced bearing elements disposed between said raceways and said continuous groove, a spacer means for each set of bearing elements disposed concentrically about said threaded shaft within the hollow portion of the drive shaft, and forked end elements axially extending from the adjoining portions of each spacer means, the forked end elements of one spacer means interfitting with and drivingly connecting with the forked end elements of the other spacer means whereby the material of one spacer means can expand or contract axially relative to the other spacer means.

7. In a motion-converting device, the combination of a reversible motor having a hollow drive shaft extending therethrough, a plurality of sets of concentric circumferentially continuous annular raceways formed in the inner wall of said shaft, an elongate nonrotating, axially movable threaded shaft passing through said hollow shaft and having a continuous helical groove formed in the peripheral surface thereof, a plurality of sets of dumbbell-shaped bearing elements extending between said raceways and said continuous groove, each set of said bearing elements simultaneously engaging with two spaced-apart raceways of the drive shaft and with two axially spaced threads of the threaded shaft, at least two spacer means disposed concentrically about said threaded shaft within the drive shaft, each spacer means having a plurality of axially and circumferentially spaced apertures for receiving a set of said bearing elements, and a pair of forked end elements axially extending from the adjoining portions of each spacer means, the forked end elements of one spacer means interfitting with and drivingly connecting with the forked end elements of the other spacer means whereby the one spacer means can expand or contract axially relative to the other spacer means.

8. A thread and nut motion-converting means adapted for operation under widely varying temperature conditions, comprising an elongate threaded shaft, at least one pair of nut means spaced axially along and cooperating with said shaft, each of said nut means comprising a plurality of bearing elements and a separate tubular spacer unit sleeved on said shaft and having spaced apertures formed therein receiving and positioning the several bearing elements circumferentially and axially of said shaft with the bearing elements protruding therethrough, the contiguous ends of said spacer units being connected by means serving to accommodate for axial expansion of said spacer units while interlocking the spacer units for rotation of one with the other, and rotatably mounted driving means encircling said spacer units and engaging the protruding portions of said bearing elements.

9. The apparatus as defined in claim 8 wherein said means connecting the contiguous ends of the several spacer means comprises an expansion joint to eliminate any likely axial expansion thrust of the spacer means, while interlocking said spacer means with each other to prevent relative rotational movement.

10. A motion-converting mechanism of the kind described, comprising a rotatably mounted elongate tubular shaft, said shaft being formed adjacent each end with one or more endless grooves extending around its inner wall, means for rotating said shaft, an exteriorly threaded shaft extending through said tubular shaft for axial movement and restrained against rotation, at least one pair of nut means between said shafts, said nut means being spaced axially along said shaft and each nut means including a group of rotating bearing elements and tubular spacer means sleeved on said threaded shaft and having apertures formed therein receiving and positioning the several bearing elements in said grooves and between the threads of said shaft, and means connecting the contiguous ends of said spacer means for joint rotation while permitting relative axial sliding movement.

11. A thread-and-nut motion-converting means adapted for operation under widely varying temperature conditions, comprising an elongate threaded shaft, at least one pair of nut means spaced axially from each other in cooperating relation with said shaft, each of said nut means comprising a plurality of bearing elements, a tubular carrier member encircling a portion of said shaft, said carrier member having circumferentially spaced apertures formed therein for receiving and positioning said bearing elements, said bearing elements having portions extending radially inwardly and radially outwardly with respect to said carrier member, said radially inwardly extending portions of said bearing elements engaging with said threaded shaft, rotatably mounted driving means encircling said carrier members and adapted to be engaged by said radially outwardly extending portions of said bearing elements, and means interlockingly engaging between the contiguous ends of said carrier members to accommodate for axial expansion of said carrier members while interlocking said carrier members for simultaneous rotation.

12. In a motion-converting device, the combination of a hollow drive member, a plurality of annular raceways formed in the inner wall of said drive member, a threaded shaft passing through said drive member, a plurality of axially spaced bearing elements operatively engaging said raceways and the threads on said shaft, at least two spacer means disposed concentrically about said threaded shaft within the hollow of the drive member, each spacer means circumferentially spacing several bearing elements about said shaft, and axially sliding interfitting means joining the contiguous end portions of the spacer means for drivingly connecting the spacer means together whereby the material of one spacer means can deform axially relative to the other spacer means.

13. In a motion-converting device, the combination of a reversible motor having a hollow drive member extending therethrough, a plurality of annular raceways formed in the inner wall of said member, a threaded shaft passing through said hollow member and having at least one continuous helical thread formed in the peripheral surface thereof, at least two spacer means disposed concentrically about said threaded shaft within the hollow portion of the drive member, a plurality of axially and radially spaced bearing elements carried by said spacer means and disposed between said raceways and the thread on the shaft, and forked end elements axially extending from the adjoining portions of each spacer means, the forked end elements of one spacer means interfitting with and drivingly connecting with the forked end elements of the other spacer means whereby the material of one spacer means is deformable axially relative to the other spacer means.

14. In a motion-conversion device, the combination of a reversible motor having a hollow drive member extending therethrough, a plurality of annular raceways formed in the inner wall of said member, an elongate nonrotating axially movable threaded shaft passing through said hollow member, at least two spacer means disposed concentrically about said threaded shaft within the drive member, a plurality of dumbbell-shaped bearing elements extending between said raceways and said threaded shaft, each said bearing element simultaneously engaging with two spaced-apart raceways of the drive member and with two axially spaced threads of the threaded shaft, each spacer means having a plurality of axially and circumferentially spaced apertures for receiving said bearing elements, and a pair of forked end elements extending axially from the adjoining end portions of the spacer means, the forked end elements of one spacer means interfitting with and drivingly connecting with the forked end elements of the other spacer means whereby the one spacer means is deformable axially relative to the other spacer means.

References Cited in the file of this patent

UNITED STATES PATENTS

| | | |
|---|---|---|
| 975,591 | Whitney | Nov. 15, 1910 |
| 2,446,393 | Russell | Aug. 3, 1948 |
| 2,675,283 | Thompson | Apr. 13, 1954 |
| 2,714,005 | Wise | July 26, 1955 |

FOREIGN PATENTS

| | | |
|---|---|---|
| 520,585 | Belgium | June 30, 1953 |
| 993,520 | France | Nov. 2, 1951 |

OTHER REFERENCES

Publication, Product Engineering, February 1952, pp. 119–123.